INVENTORS
WILLIAM L. FRY &
ALBERT F. UHLIG
BY
J. Ralph Hoge &
W. A. Schaich
ATTORNEYS INVENTORS
WILLIAM L. FRY &
ALBERT F. UHLIG
BY
J. Ralph Hoge &
W.A. Schaich
ATTORNEYS

United States Patent Office 3,160,760
Patented Dec. 8, 1964

3,160,760
INSPECTING CONTAINERS FOR OFFSET SEAMS
William L. Fry, Lafayette, and Albert F. Uhlig, Oakland, Calif., assignors to Owens-Illinois Glass Company, a corporation of Ohio
Filed July 25, 1960, Ser. No. 44,922
16 Claims. (Cl. 250—224)

This invention relates to the inspection of hollow containers and particularly to the inspection of hollow containers to detect offset seams.

In the manufacture of hollow containers such as glass bottles and jars by blowing a parison of glass in separable molds, a ridge or seam is often formed in the area of the joint between the mold halves because of misalignment or movement of the mold halves. Such a ridge or seam is commonly called an offset seam. If present in the sealing surface of a container, the seam prevents a proper seal when a side surface sealing closure is applied to the container. It is therefore desirable to detect and reject containers having offset seams which will interfere with sealing of the container.

It is an object of this invention to provide a method and apparatus for detecting offset seams in hollow containers.

It is a further object of the invention to provide such a method and apparatus wherein the inspection is conducted without contacting the sealing surface.

It is a further object of the invention to provide such a method and apparatus wherein the offset seam is detected regardless of the direction in which the mold halves are moved relative to one another, that is, regardless of the direction of the offset so that the same method and apparatus can be used to detect offset seams of different types.

Basically, the invention comprises rotating the hollow container about its axis, directing a pair of light beams against the external surface of the container in directions such that the light beams are normally refracted through the sealing surface, and positioning light sensitive cells, preferably of the silicon type, in proximity to the container in such a position that light is refracted by an offset seam directly into a silicon cell. If the magnitude of the light refracted is sufficiently great, indicating that the size of the offset seam is such that the container should be rejected, the cell passes sufficient current which upon amplification actuates a reject mechanism to reject the container or produce a signal indicating to an operator that the container should be rejected.

Figure 1:
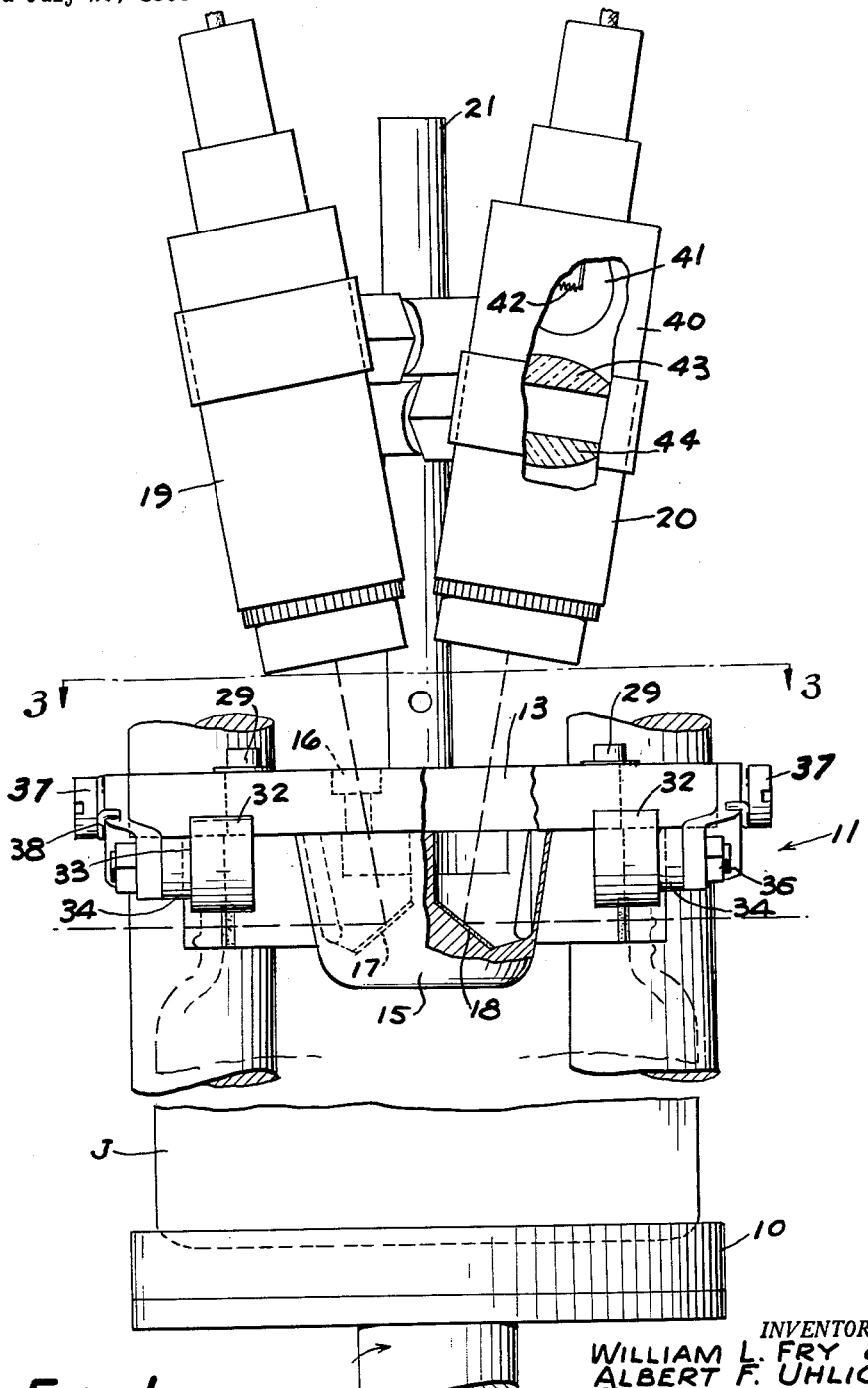
FIG. 1 is a fragmentary part sectional elevation of an apparatus embodying the invention.

Referring to FIG. 1, the apparatus embodying the invention comprises a pad 10 on which a container J which is to be inspected is positioned. The pad 10 is mounted for vertical reciprocating movement so that the container J can be elevated into position adjacent inspecting head 11 for inspection. Pad 10 is also mounted for rotation about its axis so that the jar J can be rotated during the inspection.

Figure 2:
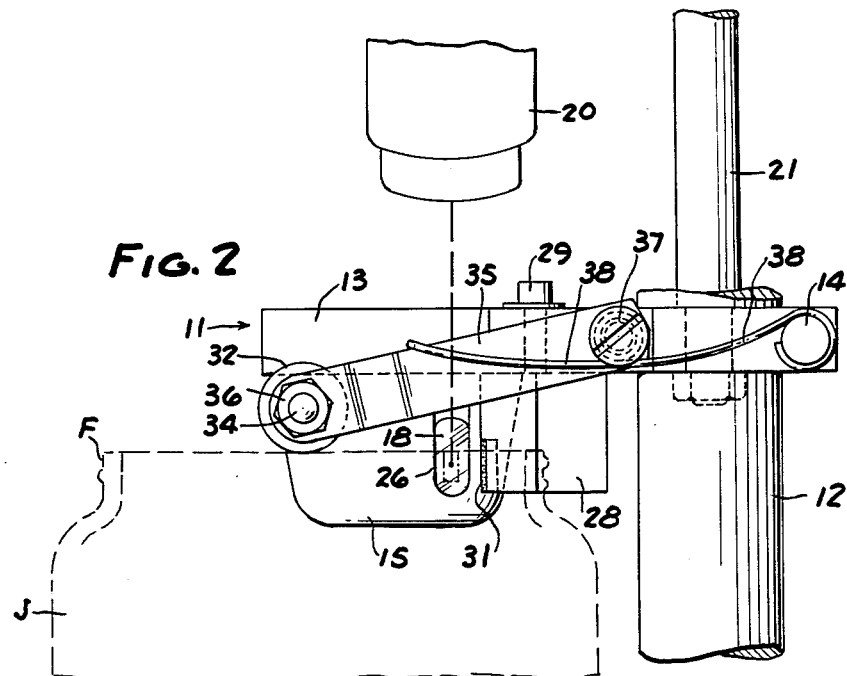
FIG. 2 is a fragmentary side elevation of the apparatus shown in FIG. 1.
Figure 3:
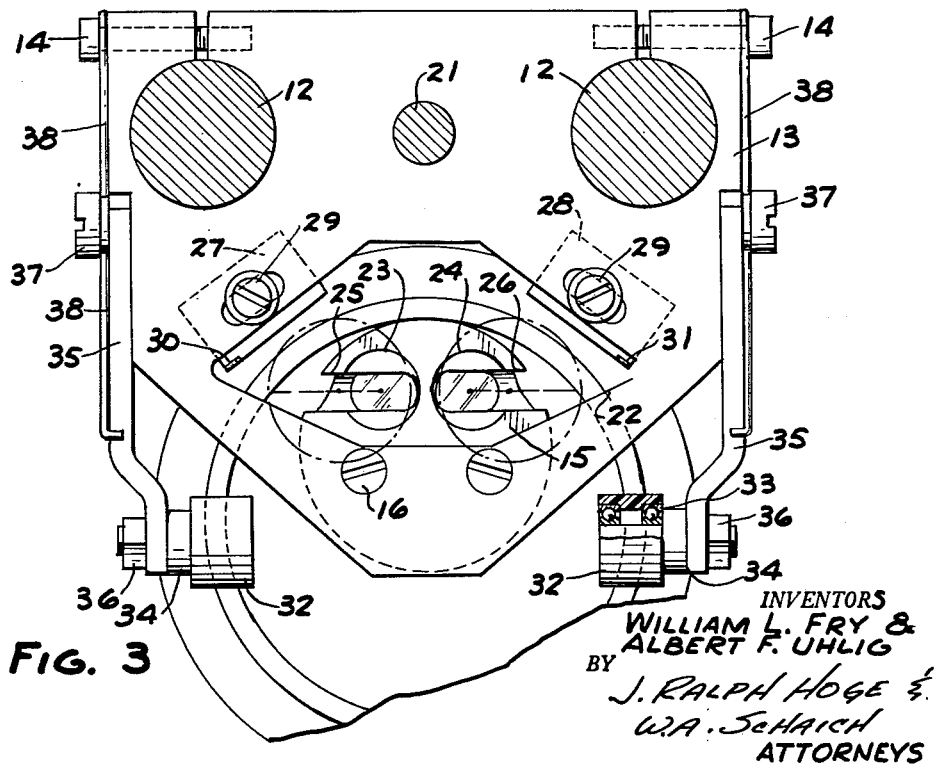
FIG. 3 is a fragmentary sectional view taken along the line 3—3 in FIG. 1.

Referring to FIGS. 2 and 3, inspecting head 11 is mounted on spaced vertical shafts 12 and comprises a plate 13 that is held in position by bolts 14 extending through spaced portions of the plate 13 that surround the shafts 12. A cone 15 of opaque non-reflecting material is mounted by screws 16 on the underside of plate 13 in position to extend through the open mouth of the container J when the container is brought into inspecting position. Mirrors 17, 18 are mounted in cone 15. A pair of light directing assemblies 19, 20 are supported on a vertical post 21 fixed to plate 13 and are adapted to direct light beams downwardly through an opening 22 in plate 13 and passages 23, 24 in cone 15 onto mirrors 17, 18 which, in turn, reflect the light beams horizontally through passages 25, 26, respectively, onto the side surfaces of the finish F of the container J. Each light directing assembly 19, 20 is adapted to focus a beam of light in the form of a rectangular spot on the outer surface of the container and comprises a housing 40, a light source 41 having a straight filament 42, and lenses 43, 44. The relationship of the beam of light and the mirrors 17, 18 is such that the beams are directed horizontally through the wall of the finish of the container onto the outer surface. For purposes of convenience in construction, as shown in FIG. 1, the inclination of the assemblies 19, 20 is approximately 10 degrees to the vertical and the mirrors 17, 18 are at an angle of 40 degrees with the horizontal in order to direct the beams horizontally through the wall of the container.

As shown in FIG. 3, the angle which each light beam makes in a horizontal plane with a radial plane of the container is approximately 45 degrees. This may vary over a wide range provided that the angle is such that the beam will normally be refracted through the wall of the container. Instead of using a straight filament to produce a rectangular spot, a mask having a rectangular aperture may be used in the system to direct a rectangular spot on the outer surface of the container.

Blocks 27, 28 are supported on the underside of plate 13 by screws 29 and silicon type light sensitive cells 30, 31 are mounted on the blocks 27, 28, respectively, with their field of vision in position to receive light from an offset seam, as presently described. The light sensitive cells are positioned in close proximity to the outer surface of the container with the plane thereof extending vertically and the greater dimension thereof extending vertically. A perpendicular to the plane of the cells forms an obtuse angle with the light beam as viewed in the horizontal plane. This perpendicular is hereinafter referred to as the line of vision of the photocell.

In order to stabilize the container J during the inspection, damper rollers 32, preferably of nylon, are provided for engagement with the top surface of the container at diametrically opposed points on the container. Each roller 32 is mounted by a roller bearing 33, preferably having nylon races, on a stud 34 that is held in position on the end of a pivoted arm 35 by a nut 36. As shown in FIGS. 2 and 3, each arm 35 is pivoted to the plate 13 by a bolt 37. A spring 38 has one end looped around bolt 14 and the other end thereof engaging the top surface of arm 35 to yieldingly urge the arm 35 downwardly onto the top surface of the container J.

Figure 4:
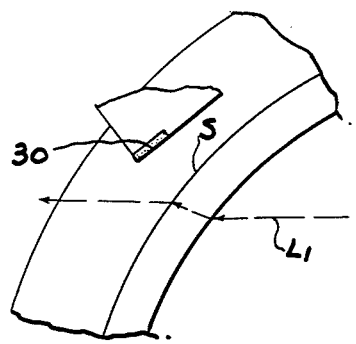
FIGS. 4-7 are fragmentary diagrammatic plan views showing the detection of offset seams according to the invention.
Figure 5:
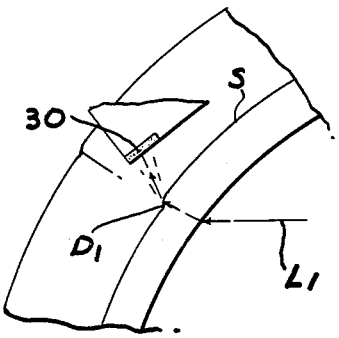
Figure 7:
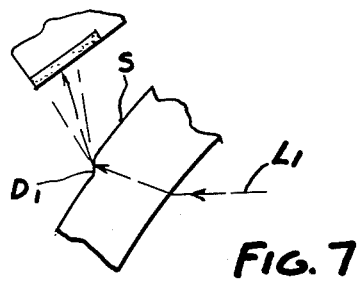

Referring to FIG. 4, each light beam is adapted to detect an offset seam by refraction. As shown in FIG. 7, the offset seam appears as a sudden rise in the surface of the container. This rise may extend from a low to a high surface as seen looking down on the container and traversing clockwise or from a high to a low surface in traversing clockwise. Either type of offset seam provides an inclined surface that merges with the low and high portions of the surface and lies generally in a plane forming an angle with a radial plane of the container. Specifically, light beams are focused on the outer surface S of the finish in a narrow vertical spot. Normally, the light beams are refracted by the inner and outer surface of the wall of the container and are redirected to the exterior out of the line of the sight of the silicon cells 30, 31. However, if an offset seam, as represented by the defect $D_1$ is present, as shown in FIG. 5, the light beam $L_1$ instead of being refracted in the same direction as when it contacts the inner surface of the wall of the container is refracted laterally upwardly, as shown in FIG. 5 and on an enlarged scale in FIG. 7, into the field of vision of the silicon cell 30.

Figure 6:
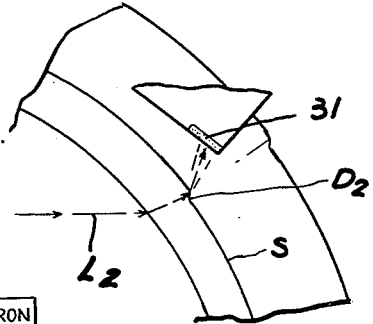

The cell 30 and the corresponding light source 19 are related so that they will detect offset seams that run from a low to a high surface in a clockwise direction around the periphery of the container, but will not detect offset seams that run from a high to a low surface in a clockwise direction such as shown at $D_2$ in FIG. 6. Accordingly, the other light source 20 is provided with the accompanying silicon cell 31 so that when a defect $D_2$ is present, the light beam $L_2$ is refracted laterally in the opposite direction or upwardly as shown in FIG. 6 into the path of the cell 31. As shown in FIG. 4, the cell 30 will not detect high-low defects and the cell 31 will not detect low-high defects.

The horizontal angle which the light beams from the light sources 19, 20 make with the outer surface S of the container can vary over a wide range, provided that the angle is such that refraction will normally occur through both wall surfaces of the finish of the container. The silicon cells 30, 31 are positioned so that the offset seams which are to be detected cause a refraction of the light beam into the cells. The proximity and the angle of the field of vision of each cell to the light beam determine the magnitude of the defect that can be detected. It can be appreciated that if a slight offset seam is present, only a small amount of light will be refracted to the silicon cell and therefore the silicon cell will only produce a low magnitude current. Slight offset seams will not interfere with the normal sealing of the container by a closure and therefore are permissible. However, if the seam exceeds a predetermined magnitude, then it will interfere with the sealing of the container and the container therefore should be rejected. The adjustment, position and the sensitivity of the silicon cell can be adjusted so that only offset seams which produce a predetermined minimum flow of current in the silicon cell will cause a rejection.

It may be noted that a perpendicular to the flat plane, that is, the line of vision of the silicon cell, always forms in an obtuse angle with the direction of the light beam. In the case of detection of offset seams which run from a low to a high in a clockwise direction looking downwardly on the container, the obtuse angle is measured in a counterclockwise direction between the line of sight of the light beam and the line of sight of the cell. In the case where the defect runs from a high to a low surface in a clockwise direction looking downwardly on the container, then the obtuse angle is measured in a clockwise direction between the line of sight of the light beam and the line of sight of the silicon cell.

Figure 8:
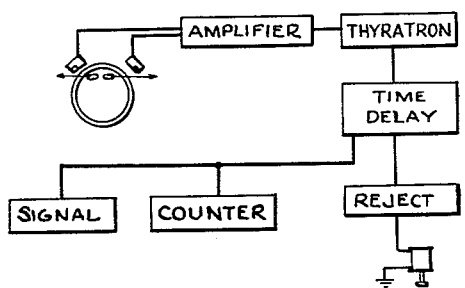
FIG. 8 is a diagrammatic block layout of the apparatus.

As shown in FIG. 8, the current signal that is produced by the silicon cell is amplified in an amplifier and can be caused to actuate a thyratron if it is of sufficient magnitude. The thyratron energizes, after a suitable time delay, a visible signal reject mechanism which rejects the container from the pad when the pad is lowered. A counter can be provided to produce a record of the number of rejected containers.

The relative position vertically of the cells 30, 31 can be adjusted relative to the spot of light so that the cell will detect offset seams only in the area which will interfere with the sealing of the container by a closure. Thus, although the offset seam may be present in the portion vertically below the cell it may not be objectionable and therefore the container need not be rejected. Accordingly, the cells are adjusted by introduction of shims so that their field of vision is in the area of the container wherein an offset seam would affect the sealing of the container.

In operation, a container is placed on the pad 10 and the pad is elevated bringing the upper end of the container into contact with the guide rollers 32 that stabilize the position of the container J on the pad 10. The light sources 19, 20 direct the light beams through the walls of the finish F of the container onto the outer surface of the container. As the container is rotated through at least one revolution, the cell 30 will detect offset seams which extend from a low surface to a high surface when the container is viewed looking down and traversing in clockwise direction while the cell 31 will detect offset seams that extend from a high to a low surface when the container is traversed in a counterclockwise direction. If the extent of the offset seam is sufficiently large, the current flow in one of the cells 30, 31 will be such that on amplification the reject circuit will be energized so that when a container is removed from the pad and moved to a subsequent station it will be rejected.

The term "light" as used herein is intended to include radiation of any type which will be transmitted through the material constituting the container.

We claim:

1. The method of inspecting the external side sealing surface of a hollow open ended container to detect offset seams thereon which comprises directing a pair of light beams at spaced points on the external side surface of the container, focusing said light beams into generally vertical spots on said side surface, causing relative rotation between said light beams and said container about the axis of the container, causing an offset seam on said side surface to direct by refraction one of said light beams out of the normal path of said light beam at an obtuse angle to the light beam, detecting said changes in the normal path of the light beam caused by offset seams and creating a reject signal in response to said changes in the normal path of the light beam.

2. The method of inspecting the external side sealing surface of a hollow open ended container to detect offset seams which comprises directing a pair of light beams at spaced points on the external side surface of the container, focusing said light beams into generally vertical spots on said side surface, causing relative rotation between said light beams and said container about the axis of the container, causing an offset seam of the low to high surface type to direct by refraction one of said light beams out of the normal path of said light beam at an obtuse angle to its respective beam as measured in a clockwise direction, causing the other said light beam to be directed by refraction by an offset seam of the high to low surface type out of the normal path of said light beam at an obtuse angle to its respective beam as measured in a counterclockwise direction, positioning cells in the path of said refracted light beams with their lines of vision at said obtuse angles to said respective light beams to produce an electrical impulse, amplifying the impulse, and causing the amplified impulse to create a reject signal.

3. The method of inspecting the external side sealing surface of a hollow open ended container to detect offset seams which comprises directing a pair of light beams at spaced points outwardly through the wall of the container onto the external side surface of the container, focusing said light beams into generally vertical spots on said side surface, causing relative rotation between said light beams and said container about the axis of the container, causing an offset seam on said side surface to direct by refraction one of said light beams out of the normal path of said light beam, detecting said changes in the normal path of the light beam caused by offset seams and creating a reject signal in response to said changes in the normal path of the light beam.

4. The method of inspecting the external side sealing surface of a hollow open ended container to detect offset seams which comprises directing a pair of light beams at spaced points outwardly through the wall of the container on the external side surface of the container, focusing said light beams into generally vertical spots on said side surface, causing relative rotation between said light beams and said container about the axis of the container, causing an offset seam of the low to high surface type to direct by refraction one of said light beams out of the normal path of said light beam at an obtuse angle to its respective beam as measured in a clockwise direction, causing the other said light beam to be directed by refraction by an offset seam of the high to low surface type out of the normal path of said light beam at an obtuse angle to its respective beam as measured in a counterclockwise direction, positioning cells in the path of said refracted light beams with their lines of vision at said obtuse angles to said respective light beams to produce an electrical impulse, amplifying the impulse, and causing the amplified impulse to create a reject signal.

5. The method of inspecting the external side sealing surface of a hollow open ended container to detect offset seams which comprises directing a pair of beams of radiant energy downwardly through the open mouth of the container and outwardly in opposite directions at spaced points through the side wall of the container onto the external side surface of the container, focusing said beams into generally vertical spots on said surface, said beams forming an angle of approximately 45 degrees with a tangent to the wall of the container, causing relative rotation between said beams and said container about the axis of the container, causing an offset seam on the side surface to direct by refraction one of said beams out of the normal path of said light beam, detecting said changes in the normal path of the beam caused by offset seams and creating a reject signal in response to said changes in the normal path of the light beam.

6. The method of inspecting the external side sealing surface of a hollow open ended container to detect offset seams which comprises directing a pair of light beams radially outwardly through the wall of the container at acute angles to tangential planes to the external side surface of the container onto spaced points on the external side surface of the container, focusing said light beams into generally vertical spots on said surface, causing relative rotation between said light beams and said container about the axis of the container, causing one light beam to be refracted by an offset seam of the low to high surface type out of the normal path of refraction of said light beam through the wall of the container at an obtuse angle to its respective beam as measured in a clockwise direction, causing the other said light beam to be refracted by an offset seam of the high to low surface type out of the normal path of refraction of said light beam by the wall of the container at an obtuse angle to its respective beam as measured in a counterclockwise direction, detecting said change in the normal direction of the light beam and creating a reject signal in response to said changes in the normal path of the light beam.

7. The method of inspecting the external side sealing surface of a hollow open ended container to detect offset seams which comprises directing a pair of light beams radially outwardly through the wall of the container onto spaced points on the external side surface of the container, focusing said light beams into generally vertical spots on said surface, causing relative rotation between said light beams and said container about the axis of the container, causing one light beam to be refracted by an offset seam of the low to high surface type out of the normal path of refraction of said light beam by said wall of the container at an obtuse angle to its respective beam as measured in a clockwise direction, causing the other said light beam to be refracted by an offset seam of the high to low surface type out of the normal path of refraction of said light beam by said wall of the container at an obtuse angle to its respective beam as measured in a counterclockwise direction, positioning a pair of light sensitive cells adjacent the external surface of the container with the line of vision of one cell forming said first mentioned obtuse angle with one light beam as measured in a clockwise direction in a horizontal plane and the line of vision of the other cell forming said second mentioned obtuse angle with the other light beam as measured in a counterclockwise direction in a horizontal plane, detecting said changes in the normal direction of the light beam caused by offset seams and creating a reject signal in response to said changes in the normal path of the light beam.

8. An apparatus for inspecting the outer surface of a hollow container for offset seams which comprises a support for the container, a pair of sources of radiant energy, means individual to each source for focusing a beam of radiant energy in a spot on a side surface of the container, means for causing relative rotation between said beams and said container about the axis of the container to scan the surface of the container, and a radiation sensitive cell individual to each said light beam positioned adjacent said container with its line of vision forming an obtuse angle with the horizontal path of the light beam, one of said cells having its line of vision forming an obtuse angle with its respective light beam measured in a clockwise direction and the other of said cells having its line of vision forming an obtuse angle with its light beam when measured in a counterclockwise direction whereby an offset seam of the low to high surface type will refract one of said light beams into the field of vision of said one cell and an offset seam of the high to low surface type will refract the other of said light beams into the field of vision of said other cell.

9. An apparatus for inspecting the outer surface of a hollow container for offset seams which comprises a support for the container, a pair of sources of radiant energy, means individual to each said source for focusing a beam of radiant energy in a spot on a side surface of the container, means for causing relative rotation between said beams and said container about the axis of the container to scan the surface of the container, and a flat silicon cell individual to each said light beam positioned adjacent said container with its line of vision forming an obtuse angle with the horizontal path of the light beam, one of said cells having its line of vision forming an obtuse angle with its respective light beam measured in a clockwise direction and the other cell having its line of vision forming an obtuse angle with its light beam when measured in a counterclockwise direction whereby an offset seam of the low to high surface type will refract one of said light beams into the field of vision of said one cell and an offset seam of the high to low surface type will refract the other of said light beams into the field of vision of said other cell, and means responsive to the energization of one of said cells to create a reject signal.

10. An apparatus for inspecting the outer surface of a hollow container for offset seams which comprises a support for the container, a pair of sources of radiant energy, means individual to each said source for focusing a beam of radiant energy in a spot on a side surface of the container with said light beam forming an acute angle with a plane tangent to said side surface, means for causing relative rotation between said beams and said container about the axis of the container to scan the surface of the container, and a radiation sensitive cell individual to each said light beam positioned adjacent said contaner with its line of vision forming an acute angle wth the horizontal path of the light beam, one of said cells having its line of vision forming on obtuse angle with its respective light beam measured in a clockwise direction and the other cell having its line of vision forming an obtuse angle with its light beam when measured in a counterclockwise direction whereby an offset seam of the low to high surface type will refract one of said light beams into the field of vision of said one cell and an offset seam of the high to low surface type will refract the other of said light beams into the field of vision of said other cell, and means responsive to the energization of one of said cells to create a reject signal.

11. An apparatus for inspecting hollow containers to detect offset seams in the external side sealing surface thereof which comprises a pad, means for rotating the pad about a vertical axis, a head, means for moving the pad and head toward and away from one another to bring a container into inspecting position, said head including a cone adapted to extend downwardly within the open end of the container but out of contact therewith, means yieldingly engaging the upper surface of the container for holding the container downwardly on the pad, a pair of light sources for directing light beams downwardly onto said cone, said cone having passages through which said light beams extend, a pair of mirrors mounted in said cone and adapted to redirect light horizontally through the walls of the container in such a direction that the light is normally refracted by the internal and external surfaces of the walls, and a silicon cell individual to each said light beam, means for supporting said cell in position adjacent the exterior surface of the container, each silicon cell being generally flat and rectangular and having its longer dimension extending vertically, a perpendicular to the plane of each cell forming an obtuse angle with the direction of the light beam through the wall of the container, one of said cells being positioned so that the obtuse angle extends in a clockwise direction between its respective light beam and a perpendicular to the cell and the other cell being positioned relative to its light beam so that the obtuse angle extends counterclockwise between its respective light beam and a perpendicular to the cell.

12. The method of inspecting the external side sealing surface of a hollow open ended container to detect an offset seam thereon, which is of the low to high surface type in a clockwise direction as the container is viewed looking downwardly, which comprises directing a light beam on the external side surface of the container, focusing said light beam in a generally vertical spot on the side surface, causing relative rotation between said light beam and said container about the axis of the container, positioning a light sensitive cell with its line of vision forming an obtuse angle with the direction of the light beam toward the container, the obtuse angle being measured in a clockwise direction from the line of vision of the cell to the light beam.

13. The method of inspecting the external side sealing surface of a hollow open ended container to detect an offset seam thereon, which is of the high to low surface type in a clockwise direction looking downwardly on the container, which comprises directing a light beam on the external side surface of the container, focusing said light beam in a generally vertical spot on the side surface, causing relative rotation between said light beam and said container about the axis of the container, positioning a light sensitive cell with its line of vision forming an obtuse angle with the direction of the light beam, the obtuse angle being measured in a counterclockwise direction from the line of vision of the cell to the direction of the light beam.

14. An apparatus for inspecting the outer surface of a hollow container for offset seams of the low to high surface type in a clockwise direction looking downwardly on the container, which comprises a support for the container, a source of radiant energy, means for focusing a beam of said radiant energy in a spot on said side surface of the container, means for causing relative rotation between said beam and said container about the axis of the container, and a radiation sensitive cell positioned adjacent said container with its line of vision forming an obtuse angle with the horizontal path of the light beam, said obtuse angle being measured in a clockwise direction from the line of vision of the photocell to the beam looking downwardly on the container, and means responsive to the energization of said cell to create a reject signal.

15. An apparatus for inspecting the outer surface of a hollow container for offset seams of the high to low surface type in a clockwise direction looking downwardly on the container, which comprises a support for the container, a source of radiant energy, means for focusing a beam of said radiant energy in a spot on said side surface of the container, means for causing relative rotation between said beam and said container about the axis of the container, and a radiation sensitive cell positioned adjacent said container with its line of vision forming an obtuse angle with the horizontal path of the light beam, said obutse angle being measured in a counterclockwise direction from the line of vision of the photocell to the beam, and means responsive to the energization of said cell to create a reject signal.

16. An apparatus for inspecting hollow containers to detect offset seams in the external side sealing surface thereof which comprises a support for the container, a pair of sources of radiant energy, means individual to each said source for directing a beam of radiant energy through a wall of said side sealing surface and focusing said beam in a spot on the external side sealing surface, means for causing relative rotation between said beams and said container about the axis of the container to scan the external side sealing surface of the container, and a radiation sensitive cell individual to each said light beam positioned adjacent said container, each said cell being of the silicon type and being generally flat and rectangular and having its longer dimension extending vertically, a perpendicular to the plane of each cell forming an obtuse angle with the direction of the light beam through the wall of the container, one of said cells being positioned so that the obtuse angle extends in a clockwise direction between its respective light beam and a perpendicular to the cell and the other cell being positioned relative to its light beam so that the obtuse angle extends counterclockwise between its respective light beam and a perpendicular to the cell.

References Cited in the file of this patent

UNITED STATES PATENTS

| | | |
|---|---|---|
| 2,805,343 | Lang | Sept. 3, 1957 |
| 2,816,234 | Ellis | Dec. 10, 1957 |
| 2,868,061 | Fedorchak et al. | Jan. 13, 1959 |